United States Patent
Wang

(10) Patent No.: US 6,600,904 B1
(45) Date of Patent: Jul. 29, 2003

(54) STRUCTURE OF A BRACKET COMPONENT FOR THE PRESS BUTTON OF A MOBILE PHONE

(76) Inventor: Hong-Chun Wang, P.O. Box No. 6-57, Chung-Ho City, Taipei Hsien 235 (TW)

( * ) Notice: Subject to any disclaimer, the term of this patent is extended or adjusted under 35 U.S.C. 154(b) by 501 days.

(21) Appl. No.: 09/659,329

(22) Filed: Sep. 12, 2000

(51) Int. Cl.[7] .................................................. H04B 1/38
(52) U.S. Cl. ........................ 455/90; 455/550; 455/575; 379/422; 200/343; 200/5 R
(58) Field of Search .................... 455/90, 550, 575, 455/351; 379/369, 424, 428.01, 370, 422; 200/343, 5 R

(56) References Cited

U.S. PATENT DOCUMENTS

| | | | | |
|---|---|---|---|---|
| 4,621,373 A | * | 11/1986 | Hodsdon ........................ 455/89 |
| 5,166,868 A | * | 11/1992 | Stanton et al. ................ 361/422 |
| 5,956,625 A | * | 9/1999 | Hansen et al. ................. 455/90 |
| 6,148,183 A | * | 11/2000 | Higdon et al. ................. 455/90 |
| 6,169,256 B1 | * | 1/2001 | Hanahara et al. ............. 200/5 A |
| 6,370,362 B1 | * | 4/2002 | Hansen et al. ................. 455/90 |

* cited by examiner

*Primary Examiner*—Thanh Cong Le
*Assistant Examiner*—Tuan Tran

(57) ABSTRACT

The present invention relates to an improved structure of a bracket component for the press button of a mobile phone, more particularly to another improved design implemented in the interior of a printed circuit board having control button on it for a bracket component by using thin membrane touch switch within a mobile phone. The bracket component according to the present invention is a curved metallic guiding bracket wherein the corresponding surrounding.has an inward cut curve, and such cut curve design has a four supporting legs deposed around the aligned design on the printed circuit board allowing a better positioning function. Furthermore, the present invention with the cut curve design has a characteristic to resume the press keys more effectively, and in turn elongate the life of the bracket.

3 Claims, 4 Drawing Sheets

STRUCTURE OF A BRACKET COMPONENT FOR THE PRESS BUTTON OF A MOBILE PHONE

BACKGROUND OF THE INVENTION

1. Field of the Invention

The present invention relates to an improved structure of a bracket component for the press button of a mobile phone, wherein there are corresponding cut curves around the periphery of the bracket, and such cut curve design reduces the contact between the bracket and the printed circuit board and forms four circular points around the periphery for pressed positioning. Such arrangement of the cut curve design can reinforce the restoring elasticity of the bracket in order to elongate the life of the bracket.

2. Description of the Prior Art

The conventional press keys of the mobile phone generally are divided into two types, namely carbon type and thin membrane type, wherein the carbon type uses plastics as the basic material to form a whole-piece injected formation, and such press keys has a restoring characteristic and a resistance to the pressing when the keys are pressed, and there is a conductive carbon deposed at the bottom. When the keys are pressed, it conducts the circuit on the printed circuit board and sends out signals.

However, the mobile phone will generate heat with high-temperature due to the electro-thermal energy generated from the telephone conversation or by the direct sunlight. At that time, the carbon-style plastic press key will be softened and change its composition of matter. As soon as it resumes from the normal temperature, the plastic material will be hardened or oxidized, and hence the life of carbon-style press keys is experiencing a tough test.

In view of the above description, the inventor of the present invention based on years of experience in the related industry conducted extensive research to enhance the press key technology and that is the thin membrane style press keys which comprise a plastic membrane and a bracket component, and at the bottom of the thin plastic membrane, there attaches glue for sticking the press keys. Such bracket component itself is a curved metallic bracket, it conduct the circuit on the printed circuit by pressing the keys. Since the thin membrane press keys uses the metallic characteristics of the bracket, therefore the bracket has pressure resistance and restoring stress is the valuable consideration taken into account for the design of the present invention.

Therefore, after performing many tests and experiments, the invention hopes that (and also it the primary objective of the present invention) it could provide a bracket component with excellent restoring stress and better conductive and quick contact. When implemented in the thin membrane style press keys of a mobile phone, it can drastically enhance the life of its application.

The characteristics of the improved bracket component structure according to the present invention are: having corresponding cut curves around the corresponding positions on the bracket, and such cut curve design can reinforce the overall restoring stress of the bracket. Furthermore, the bracket forms a four circular point positioning by press to reduce the contact between the bracket and the printed circuit board, which can enhance the sensitivity between the bracket and the printed circuit board and then produce a thin membrane press keys of longer application life and higher precision.

To make it easier for our examiner to understand the objective of the invention, its performance and advantages, we use a preferred embodiment in together with the attached drawings for the detailed description of the invention.

BRIEF DESCRIPTION OF THE DRAWINGS

Other objects, features, and advantages of the invention will become apparent from the following detailed description of the preferred but non-limiting embodiment. The description is made with reference to the accompanying drawings, in which.

DESCRIPTION OF THE PREFERRED EMBODIMENT

Figure 1:
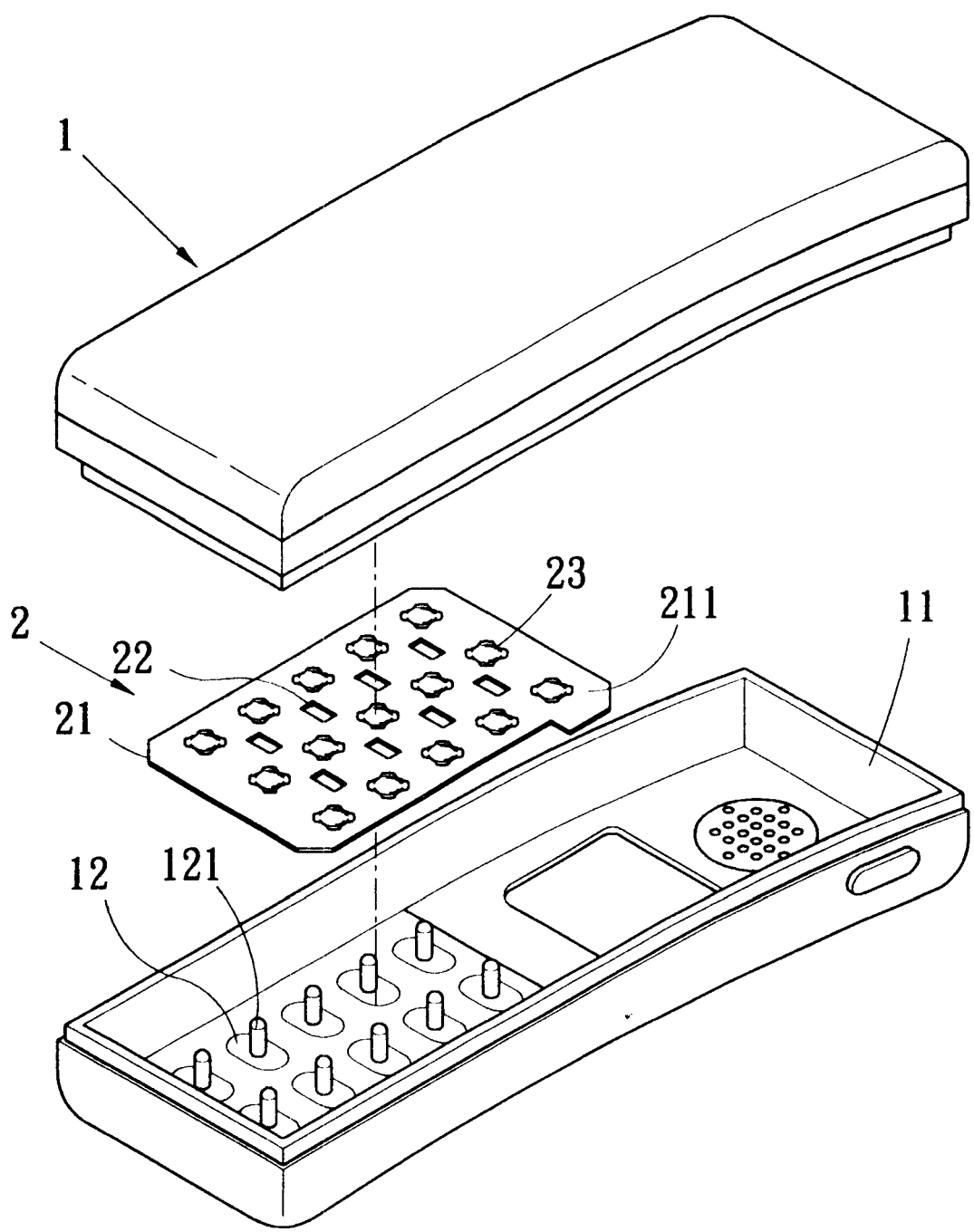
FIG. 1 shows the diagram of the disassembled parts of the present invention.
Figure 2:
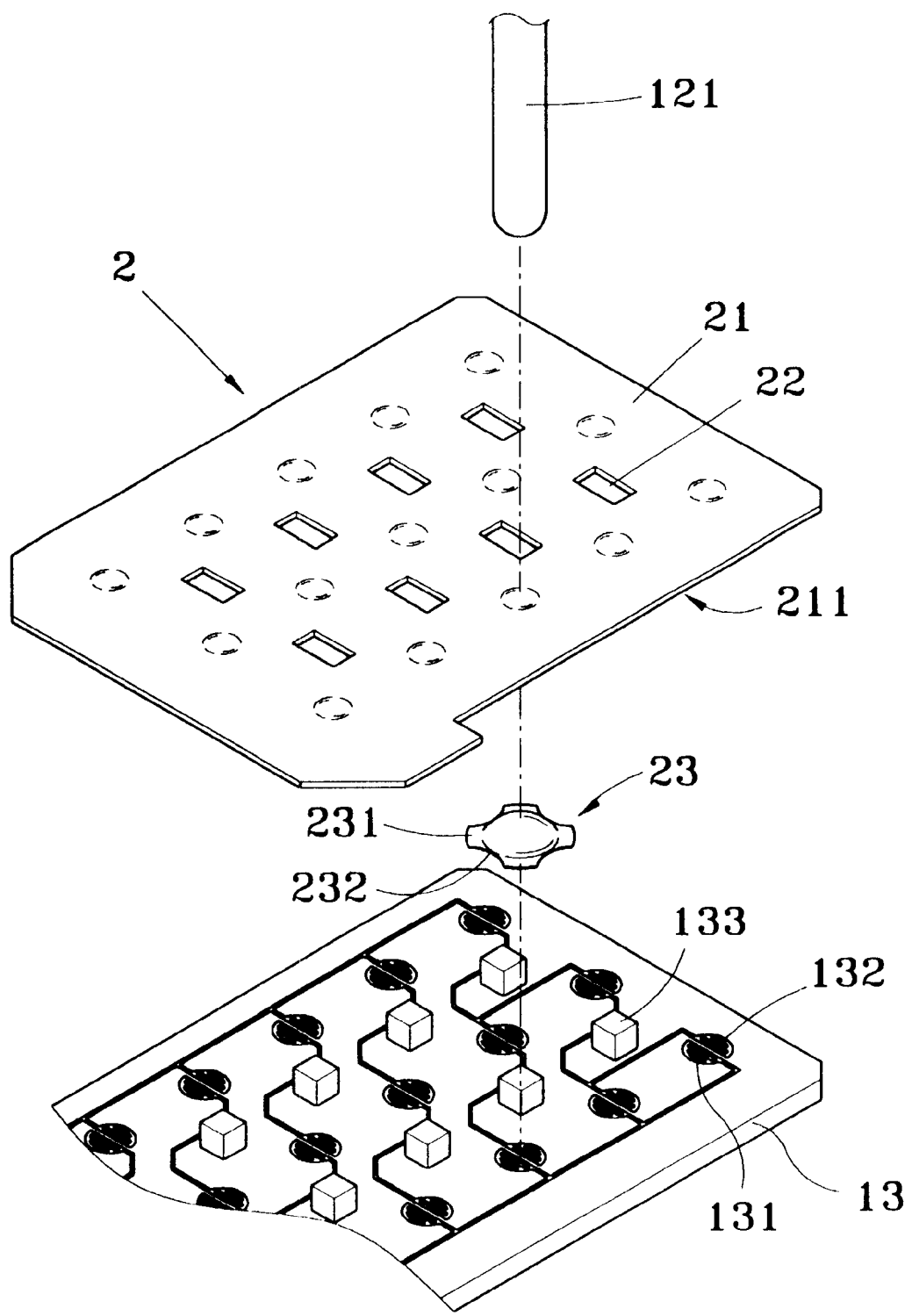
FIG. 2 shows the illustration of how to use the present invention.

Firstly, please refer to FIGS. 1 and 2. The figures respectively show the disassembled parts of the implementation, and the illustration on the application of the present invention. A bracket component 23 according to the present invention is implemented to a thin membrane press key 2 inside a mobile phone 1. A plurality of control buttons 12 are deposed inside a housing 11 of the mobile phone 1, and there is a press rod 121 deposed at the central position of each of the control buttons 12, and the press rod 121 presses against a thin plastic membrane 21 of a press key 2 and corresponds to a bracket component 23. The bracket component 23 attached to the attaching surface 211 (in corresponsive with the corresponding surface of the printed circuit board 13) of the plastic membrane 21 is fixed by the glue attached on the attaching surface 211. Every bracket component 23 has a positioning hole deposed in between bracket components for securing the positioning the thin membrane press keys 2 to the positioning block 133 on the printed circuit board 13. The number of positions and quantities are corresponding to each control key 12 and the contact points 131, 132 of the printed circuit board 13. Due Due to the movement of the bracket component 23 and after pressing the control key 12, the press rod 121 will press against the plastic membrane 21 and the center of the bracket component. It will complete the signal transmission as the conductive portion 231 at the center of the bracket component 23 contacts with the conductive points 131, 132.

Figure 3:
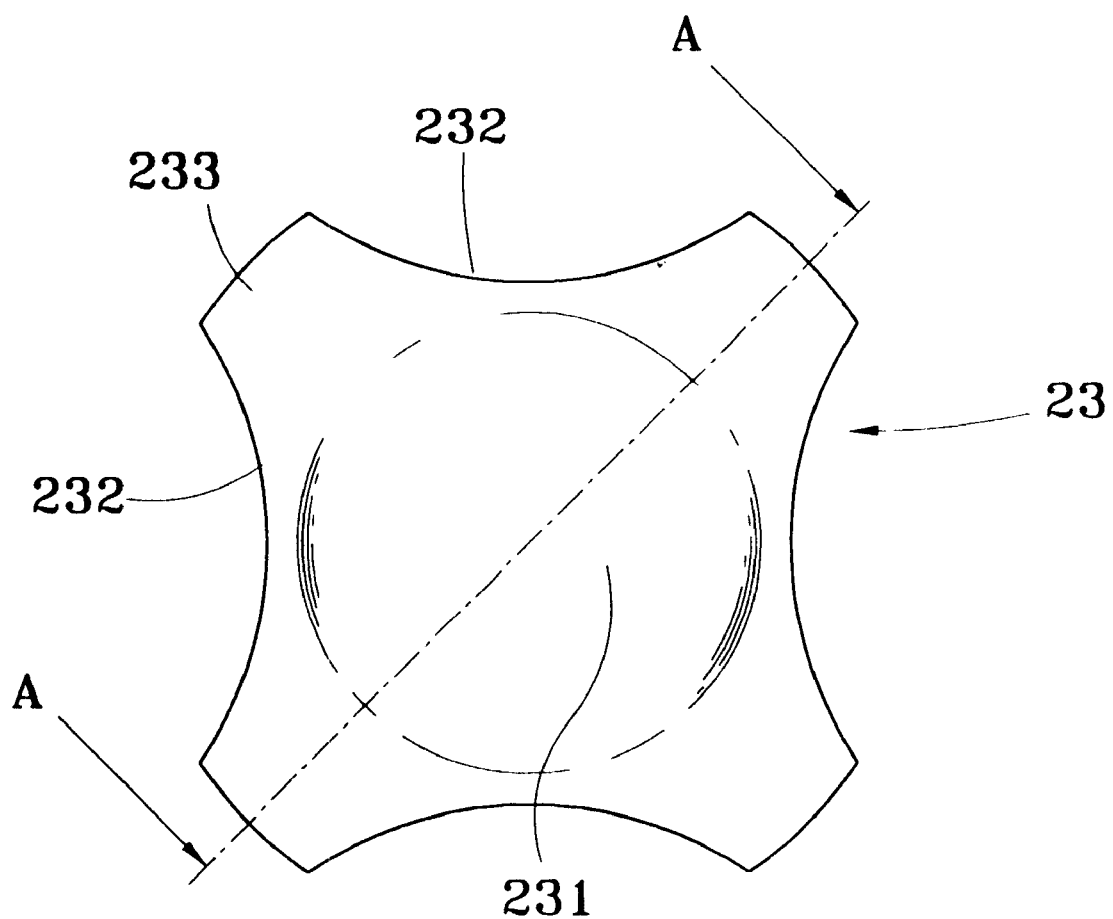
FIG. 3 shows the down-view plane of the present invention.
Figure 4:
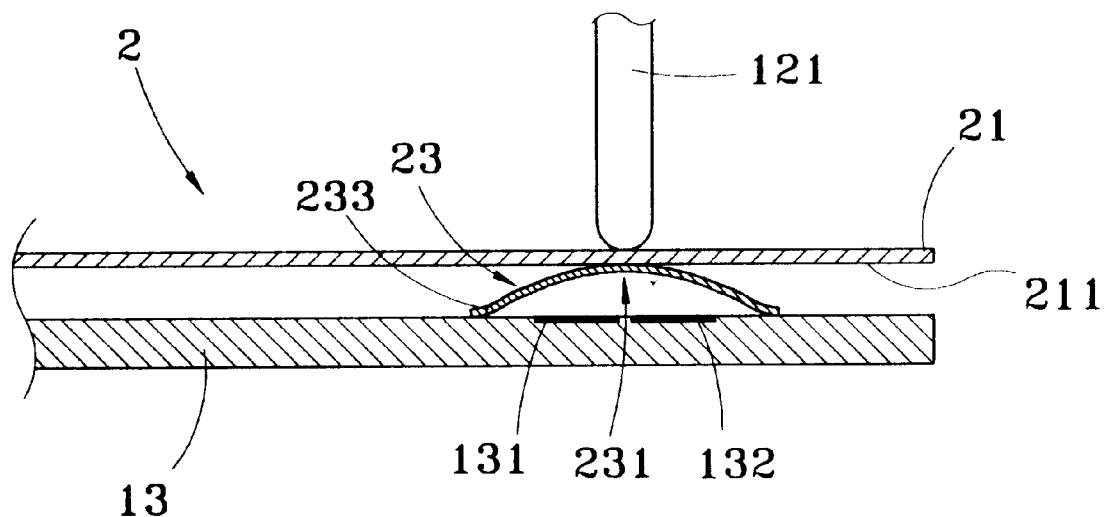
FIG. 4 shows the side-view plane of the present invention.
Figure 5:
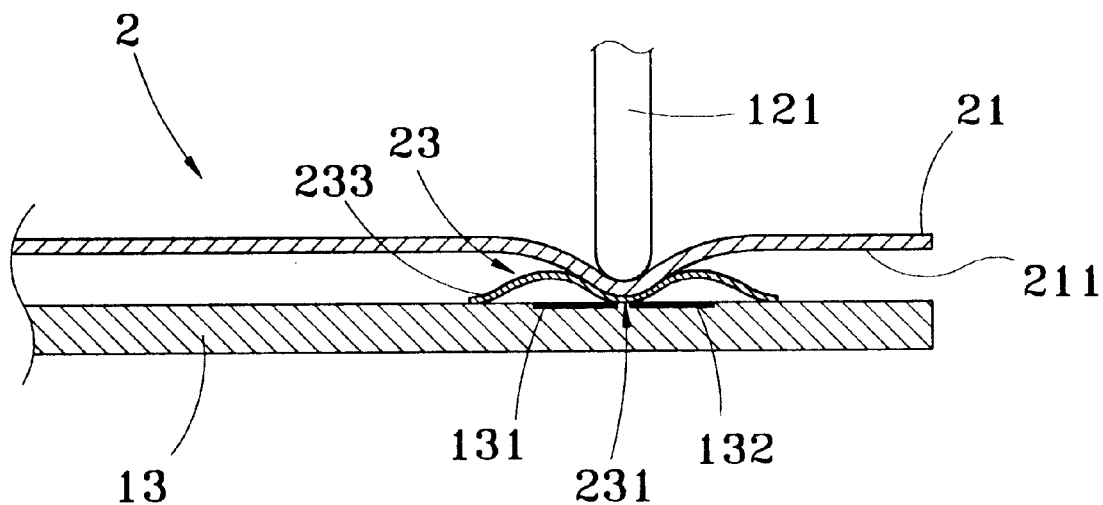
FIG. 5 shows the illustration of the movement according to the present invention.

Further, please refer to FIGS. 3, 4, and 5. In the figures, the bracket component 23 depicted in the figures is a metallic circular plate formed by pressing as a whole-piece formation, and there is a curved conductive portion 231 at the central position, and there is a cut curve 232 design in the corresponding positions around the bracket component 23. Every two curves form a supporting leg 233 for positioning the printed circuit board 13. The cut curve design allows it to keep away from the conductive points 131, 132 of the aligned circuitry on the printed circuit board 13 in order to reduce the improper pressing that causes the defective conduction or short circuit. When the key is pressed, the supporting leg 233 will fully extend outward to the sides and allow the conductive portion 231 being effectively attached to the conductive points and form a conduction passage.

Such arrangement can enhance the sensitivity of the conduction for the bracket component 23.

Since the method used for the conduction with the thin membrane press keys 2 is by the pressure resisting and stress restoring characteristics of the metallic material of the bracket component 23, therefore the bracket component 23 of the present invention is composed of many metallic element alloys. The cut curve 232 designs around the printed circuit board is able to enhance the restoring resistance and sensitivity of the bracket component 23, and in turn elongate the application life of the bracket component.

In summation of the above description, the present invention herein enhances the conventional structure and further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An improved structure of a bracket component of a press key of a mobile phone, which is implemented inside a mobile phone as a thin membrane bracket component, comprising a plastic membrane and a metal alloy bracket component, wherein the plastic membrane has glue attached on it for attaching the bracket component in a fixed position, and said bracket component characterized in:

a bracket composed of a plurality of metal element alloys, and is press as a whole piece, wherein there is a prominent curve at the central position of the bracket forming a conductive portion for the conduction;

a cut curve design cut inward and deposed around the corresponding positions of the bracket, and every two cut curves form a supporting leg for positioning function;

the cut curve design keeps the bracket away from the electrical contact points aligned on the circuitry of a printed circuit board; and when the keys are pressed, the supporting legs extends outward and allows the conductive portion attaches the conductive points to form a current passage.

2. An improved structure of a bracket component of a press key of a mobile phone as set forth in claim 1; wherein the conductive contact of the thin membrane press key is by the elasticity of the bracket made of pressure resisting and stress restoring materials.

3. An improved structure of a bracket component of a press key of a mobile phone as set forth in claim 1, wherein the cut curve of the bracket has at least three even cut curves forming at least three supporting legs for the implementation.

* * * * *